United States Patent

Donnelly et al.

[11] Patent Number: 5,901,789
[45] Date of Patent: May 11, 1999

[54] DEFORMABLE WELL SCREEN

[75] Inventors: Martin Donnelly, Amsterdam; Jacobus Hendrikus Petrus Maria Emmen, Rijswijk; Cornelis Jan Kenter, Rijswijk; Wilhelmus Christianus Maria Lohbeck, Rijswijk; Paulus Hermanus Franciscus Reijnen, Rijswijk; Brent Reynolds Ross, Rijswijk; Allan James Samuel, Rijswijk, all of Netherlands

[73] Assignee: Shell Oil Company, Houston, Tex.

[21] Appl. No.: 08/745,391

[22] Filed: Nov. 8, 1996

[30] Foreign Application Priority Data

Nov. 8, 1995 [EP] European Pat. Off. .............. 95203038

[51] Int. Cl.$^6$ .................................................. E21B 43/08
[52] U.S. Cl. ........................... 166/381; 166/207; 166/230
[58] Field of Search ..................... 166/230, 233, 166/228, 231, 207, 381

[56] References Cited

U.S. PATENT DOCUMENTS

| | | | |
|---|---|---|---|
| 261,252 | 7/1882 | Olmsted | 166/230 |
| 1,135,809 | 4/1915 | Jones . | |
| 1,229,437 | 6/1917 | Foster | 166/230 |
| 1,342,986 | 6/1920 | Cater | 166/230 |
| 1,380,182 | 5/1921 | Bigelow . | |
| 1,514,062 | 11/1924 | McLain . | |
| 2,812,025 | 11/1957 | Teague et al. . | |
| 2,858,894 | 11/1958 | Akeyson | 166/230 |
| 2,877,852 | 3/1959 | Bashara | 166/230 |
| 2,985,241 | 5/1961 | Hanslip | 166/230 |
| 3,087,560 | 4/1963 | Dodson | 175/314 |
| 3,134,442 | 5/1964 | Jennings | 166/207 |
| 3,270,817 | 9/1966 | Papaila . | |
| 3,353,599 | 11/1967 | Swift . | |
| 5,366,012 | 11/1994 | Lohbeck | 166/277 |
| 5,404,954 | 4/1995 | Whitebay et al. | 166/230 |
| 5,664,628 | 9/1997 | Kiehler et al. | 166/228 |

FOREIGN PATENT DOCUMENTS

| | | |
|---|---|---|
| 310 171 B1 | 9/1988 | European Pat. Off. . |
| 360 358 B1 | 9/1989 | European Pat. Off. . |
| 674 095 A2 | 9/1995 | European Pat. Off. . |
| 1066628 | 6/1982 | U.S.S.R. . |
| 2 155 040 | 9/1983 | United Kingdom . |
| WO 93/25800 | 12/1993 | WIPO . |
| WO 96/00821 | 1/1996 | WIPO . |

*Primary Examiner*—Hoang C. Dang

[57] ABSTRACT

A deformable well screen for preventing migration of solid particles into a hydrocarbon production well is disclosed, the screen including at least one substantially tubular filter layer of which the sieve opening size remains fairly constant during or after expansion and/or other formation of the screen. Optionally the screen also includes a series of circumferentially scaled filter segments that are arranged around an expandable slotted tube, an expandable slotted tube of which the slots are filled with resin coated granules, an expandable slotted tube with micro-slots, an assembly of woven metal wire screens that are sintered together and/or a synthetic geotextile fabric.

16 Claims, 2 Drawing Sheets

DEFORMABLE WELL SCREEN

FIELD OF THE INVENTION

The invention relates to a well screen for preventing migration of solid particles, such as sand and other formation minerals, gravel and/or proppant, into a hydrocarbon production well. More particularly, the invention relates to a well screen comprising at least one substantially tubular filter layer of which the sieve opening size is tailored to the size of particles that are to be blocked by the screen.

BACKGROUND TO THE INVENTION

UK patent specification 2,115,040 discloses a wellbore screen. This screen may include outer and/or inner protective layers which are co-axial to the filter layer and which have a much larger sieve opening size than the filter layer or layers.

A problem encountered with the screen of UK patent specification '040 is that woven metal wire and other filter sheets are fragile and can be easily squeezed and damaged during installation and use. Only a minor deformation of the filter sheet may already result in variation of the sieve opening which may hamper a proper performance of the screen.

Furthermore sand screens of the known type are typically made in a flat or tubular shape and are designed to remain in their original shape without substantial deformation during and/or after installation. However, in boreholes with an irregular surface and/or sharp bends this requires the use of a screen with a much smaller diameter than that of the wellbore. Such use of a small diameter screen will result in high fluid flowrates through the sieve openings of the screen, strong wear of the screen and an increased risk of plugging of the screen and of collapse of the borehole.

It is an object of the invention to alleviate the problems.

SUMMARY OF THE INVENTION

The screen according to the invention thereto is deformable such that it can be expanded, bent, compressed and/or fluidized during installation of the screen within a wellbore and that any variation of the sieve opening size of the screen as a result of such deformation remains within predetermined limits.

Preferably the screen is expandable downhole to such a size that it, or a surrounding protective layer, can be set at least partly against the surrounding formation. At locations, such as washouts and doglegs, where the borehole wall is so irregular that still a gap would remain around the expanded screen a resin impregnated gravel could be placed in the gap to ensure a continuous mechanical contact between the screen and formation.

Optionally the screen according to the invention is arranged around an expandable slotted tube which induces the internal diameter of the screen to be increased during installation of the screen and tube assembly in a wellbore while the variation in sieve opening size of each filter layer of the screen as a result of such expansion of the screen is less than fifty per cent.

A suitable expandable slotted tube for use with the screen is disclosed in the specification of international patent application PCT/EP 93/101460.

In a preferred embodiment the screen according to the invention comprises a series of scaled filter sheets which are arranged around an expandable slotted carrier tube and which, when seen in a circumferential direction, are connected at one edge to said tube and at another edge at least partly overlap an adjacent filter sheet. Optionally, the scaled filter sheets are made of a flexible permeable material which is selected from the group of a perforated metal plate, a metal plate comprising an array of substantially tangential slots, sintered woven metal wires and a synthetic fabric.

In another preferred embodiment the screen according to the invention comprises an expandable slotted tube of which the slots and any gaps between the tube and borehole wall have been filled in situ with granules that are bonded to each other and to the rims of the slots by a bonding agent such that pore openings of a selected size remain between the granules.

In the above embodiments the slotted tube can be expanded to a diameter which may be 50% larger than the diameter of the unexpanded tube. The sieve opening size of the screen remains substantially unaffected by such large expansion although the scaled filter sheets may be stretched in a circumferential direction as a result of frictional forces and deformed slightly by the axial contraction of the slotted carrier tube during the expansion process.

In a suitable embodiment the screen according to the invention comprises at least one tubular filter layer which is made of a woven metal wire screen; and an outer protective layer which co-axially surrounds the filter layer or layers and an inner protective layer which is fitted co-axially within the protective layer or layers, which protective layers comprise each a woven metal wire screen having a larger sieve opening size and wire thickness than at least one of the filter layers, and wherein the filter and protective layers are sintered together.

A principal advantage of sintering the various layers of woven metal wire screen together is that it produces a screen having a section modulus which is greater than the sum of section moduli of the individual layers. This results in a robust screen of which the sieve size does not change significantly during or after deformation which make the screen coilable around a drum and installable into a well by reeling the screen from the drum.

Optionally at least one filter layer comprises wires which are oriented in a substantially helical weaving pattern relative to a central axis of the tubular screen.

It has been found that if said pitch angle is approximately 45° then local elongation and/or shortening caused by expansion, compression and/or bending of the tubular screen then a square mesh sieve will be deformed to a diamond pattern, and the sieve opening will only change slightly and by a predictable amount.

A tubular screen having a helical weaving pattern can be conveniently manufactured from sheets or strips having the wires substantially parallel and normal to the edges, by forming those sheets or strips into a helically wound tubular shape having abutting edges, and welding the abutting edges together, as is done for example for helically welded metal tubes.

It is observed that SU patent specification 1,066,628 discloses that a screen can be made by scrolling six layers of metal filtration cloth around a perforated metal tube and then sintering the pack. However, in the known screen the various layers are made of the same cloth. This will generally cause the wires of adjacent layers to partly block the sieve openings of adjacent layers which will reduce the effective sieve opening in a rather irregular and unpredictable way.

Other screens are disclosed in U.S. Pat. Nos. 2,858,894 and 3,087,560 and in a sales brochure of Haver and Boecker concerning screens sold under the trademark "POROPLATE".

In an alternative embodiment of the screen according to the invention the screen comprises at least one filter layer which is substantially made of a fabric, such as a needlefelt. Suitably the needlefelt comprises a material selected from the group of steel wires and synthetic fibers. Optionally the synthetic fibers are selected from the group of aramid fibers and "CARILON" polymer fibers which have a high chemical resistance. "CARILON" polymer is a linear alternating copolymer of carbon monoxide and one or more olefinically unsaturated compounds. European patent specifications Nos. 360,358 and 310,171 disclose methods for the manufacture of fibers of this polymer by gel and melt spinning, respectively. Preferably the filter layer comprises an elongate fabric strip which is wound in an overlapping helical pattern into a tubular shape, whereby adjacent windings have an overlap of between 10% and 90%, preferably about 50%.

It is observed that international patent application PCT/EP/01460 discloses that two co-axial slotted liners may be placed within the wellbore such that after expansion the slots are not in line in radial direction. This non-overlapping arrangement aims to induce fluids to traverse through the liners via a zig-zag path thereby preventing sand from entering the borehole. The liners used in this prior art reference comprised axial slots having a length of at least 25 mm and a width of at least 0.7 mm.

Surprisingly it was found that instead of using the interaction between non-overlapping relatively large slots of co-axial liners to prevent inflow of sand a suitable screen may be created by using a single expandable tube having micro-slots.

Therefore, in yet another alternative embodiment of the screen according to the invention the screen comprises an expandable tubular body with micro-slots that are arranged in a staggered and overlapping pattern which slots substantially have a length less than 10 mm before expansion of the tubular body.

Preferably the micro-slots substantially have before expansion of the tubular body a length less than 5 mm and a width less than 0.3 mm.

A principal advantage of the use of a single expandable sand-screen with micro-slots over the use of co-axial liners with non-overlapping relatively large slots is that it generates a screen with a more regular substantially diamond-shaped sieve opening size after expansion.

Suitably the expandable tubular body with micro-slots is made of nickel and has a wall thickness which is less than 1 mm. In order to protect such a fragile body from damage during and after installation it is preferred to arrange the body co-axially between two conventional expandable slotted liners having larger slots and a larger wall thickness than the body. Suitably these protective liners are made of steel and comprise slots having a length of at least 15 mm and a width of at least 2 mm.

U.S. Pat. No. 1,135,809 discloses a well screen with staggered axial slots. The screen according to this prior art reference, however, is installed downhole without being subject to any significant expansion or other deformation, so that the slots remain in their original elongate shape.

The invention also relates to a method for installing a tubular well screen in a hydrocarbon production well, the method comprising arranging the screen around an expandable slotted tube, lowering the screen and tube assembly into the well, inducing the tube to expand thereby increasing the internal diameter of the screen to be increased with at least five per cent while any variation of the sieve opening size of each filter layer of the screen is less than fifty per cent.

Optionally the screen and tube assembly is wound around a drum and reeled from said drum into the well during installation.

In an alternative embodiment the method according to the invention comprises lowering an expandable slotted tube into the well, inducing the tube to expand, injecting granules coated with a bonding agent into the expanded tube and wiping the granules at least partly away from said interior into the expanded slots of the tube and any gaps that may be present between the expanded tube and the borehole wall, and allowing the bonding agent to cure. In this way a permeable matrix of bonded solid particles is formed which substantially fills the expanded slots and any gaps between the expanded tube and the borehole wall.

The coated granules may consist of resin coated granules having a diameter between 1 and 5 mm which are injected via injection parts located behind the expansion cone and a wiper set may be trailed behind the cone in order to wipe the granules from the interior of the expanded tube into the slots and any gaps surrounding the tube.

These and other features, objects and advantages of the method and screen according to the invention will become apparent from the accompanying claims, abstract and the following detailed description.

DETAILED DESCRIPTION OF THE INVENTION

Figure 1:
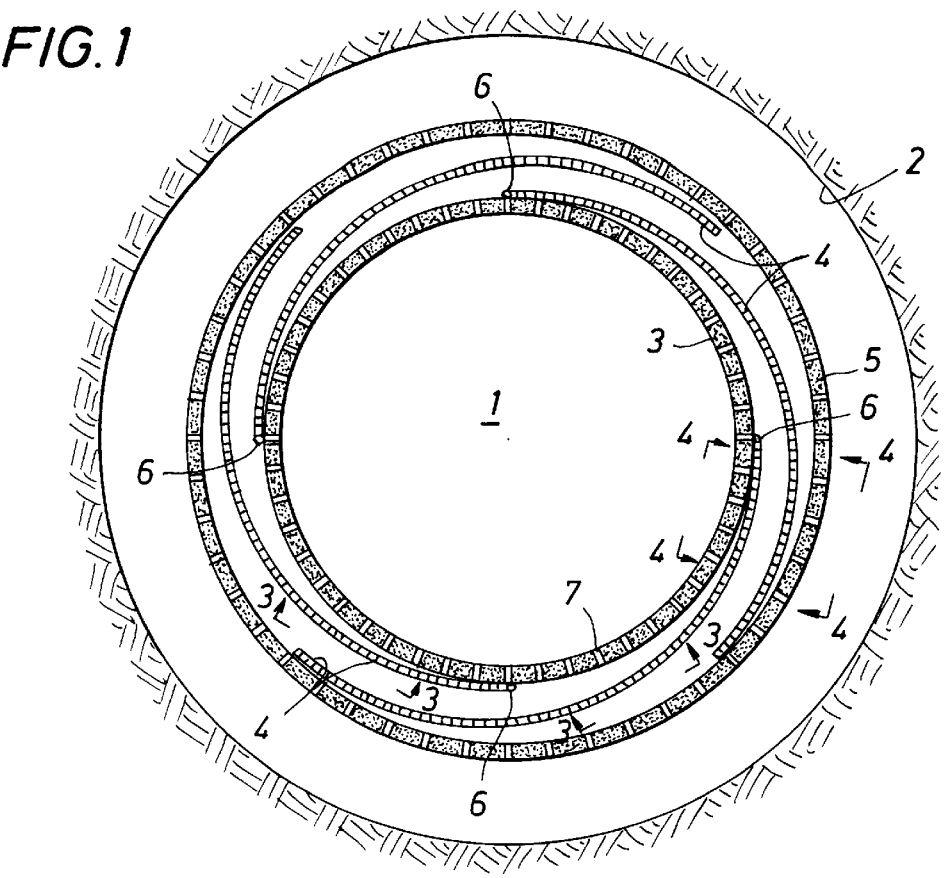
FIG. 1 shows a cross-sectional view of a segmented screen which is lowered into a well between two unexpanded slotted tubes.
Figure 2:
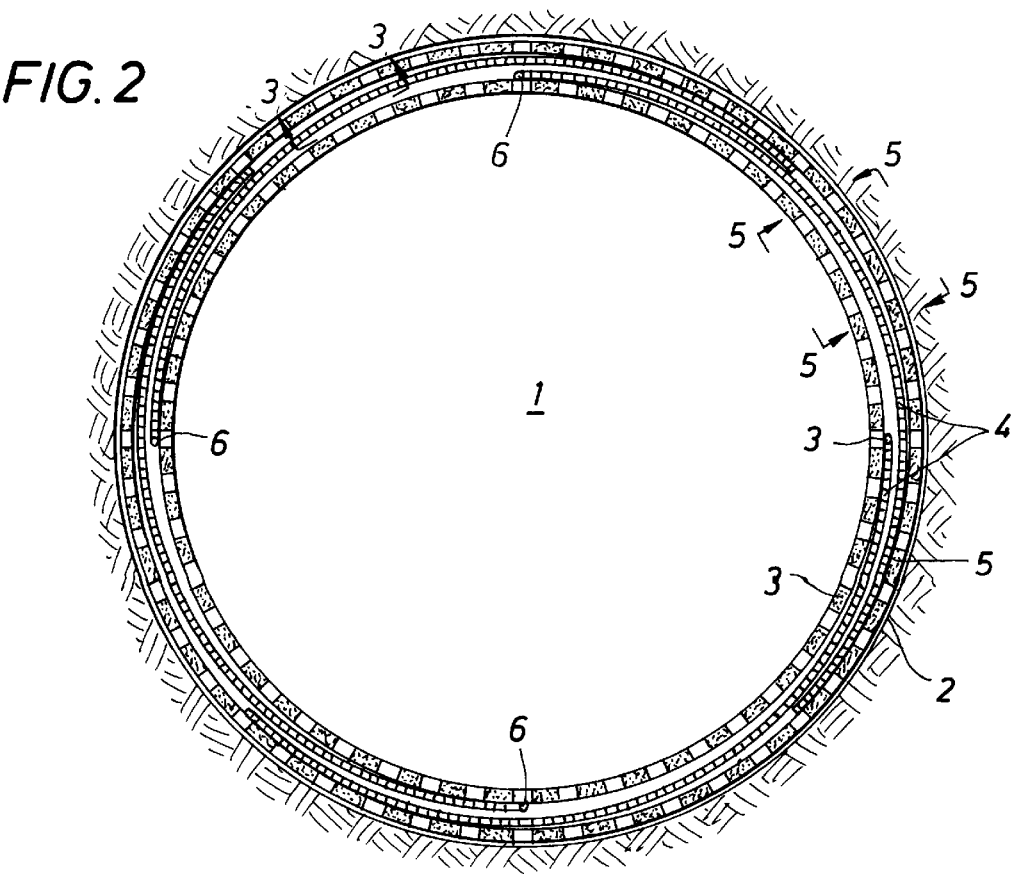
FIG. 2 shows a cross-sectional view of the screen and tube assembly of FIG. 1 after expansion of the assembly.

Referring now to FIG. 1 and 2 there is shown a borehole 1 passing through an underground hydrocarbon bearing formation 2.

An assembly of an expandable slotted carrier tube 3, a well screen comprising four scaled perforated filter sheets 4 and an expandable slotted protective tube 5 has been lowered into the borehole 1.

Each filter sheet 4 is connected near one edge to the carrier tube 3 by a lug 6 such that at an opposite edge it overlaps an adjacent sheet 4.

The lugs 6 permit the filter sheets 4 to move axially with respect to the carrier tube 3 and in that way to enable the axial contraction of the carrier tube 3 as a result of tangential expansion to be compensated for by axial sliding of the filter sheets 4 over the carrier tube.

Figure 4:
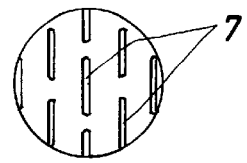
FIG. 4 is a side view of a section of the unexpanded slotted carrier and protective tube of FIG. 1 shown at an enlarged scale.

In FIG. 1 the assembly is in an unexpanded form so that the slots 7 of the two slotted tubes 3 and 5 have an elongate longitudinal shape and a constant width, when seen in circumferential direction as shown in FIG. 4, the filter sheets 4 in a longitudinal direction the sheets may also be wrapped helically around the carrier tube 3 at such pitch angle that the sheet will contract during the expansion in longitudinal direction in substantially the same way as the slotted tube 3.

During the expansion process adjacent filter sheets 4 will slide relative to each other and the sheets 4 will also slide relative to the inner wall of the protective tube 5.

In the embodiment shown the sheets 4 are made of a perforated nickel foil which is a low friction material.

Figure 3:
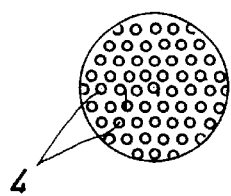
FIG. 3 is a side view of a section of one of the filter sheets of the segmented screen of FIG. 1 and 2 shown at an enlarged scale.

In order to further reduce friction during expansion the filter sheets 4 may comprise substantially tangential slots instead of the circular perforations shown in FIG. 3. The width of such tangential slots will not change significantly during expansion of the assembly within the borehole 1.

Instead of using a nickel foil for the filter sheets 4 these sheets may also be made of another material, such as a sintered woven wire mesh and a synthetic fabric which are described in more detail elsewhere in this specification.

Instead of using a slotted steel protective tube 5 around the filter sheets 4 any other expandable and permeable protective tubular body may be used, such as a knitted geotextile sock or a scrolled perforated metal sheet. Instead of using a plurality of filter sheets which each only partly surround the carrier tube 3 also a single scrolled filter sheet may be used which is not secured. As an alternative to using lugs 6 for connecting the filter sheets 4 to the carrier tube 3, the sheets 4 may be spot welded or connected by other mechanical fasteners to the carrier tube.

Figure 5:
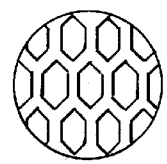
FIG. 5 is a side view of a section of the expanded carrier and protective tube of FIG. 2 shown at an enlarged scale.

In FIG. 2 the assembly is shown in an expanded form so that the slots 7 of the slotted tubes 3 and 5 have a diamond shape as can be seen in FIG. 5. Expansion of the assembly may be accomplished by moving an expansion cone through the steel carrier tube 3 as described in international patent application PCT/EP93/01460, whereby the expansion of the carrier tube also induces the outer tube 5 to expand until it substantially engages the borehole wall.

During the expansion process overlap between adjacent filter sheets 4 is reduced, but the circumferential length of the scaled sheets 4 is selected sufficiently large that still at least some overlap remains after the expansion.

As illustrated in FIG. 3 the filter sheets 4 consist of perforated plates and the width of the perforations remains substantially the same during and after the expansion process. However, the carrier tube 3 will contract slightly in longitudinal direction as a result of the expansion process. Therefore it is preferred to arrange the lugs 6 within slots which permit the lugs 6 to slide in longitudinal direction relative to the carrier tube 3. However instead of using lugs the front edges of the filter sheets 4 may also be secured to the carrier tube 3 by spot welding. In such case this may result in some longitudinal compaction of the front edges of the filter sheets during the expansion process if these front edges have a longitudinal orientation. However, alternatively the front edges of the filter sheets 4 may have a helical orientation relative to the carrier tube 3. In such case one or more filter sheets 4 may be wrapped helically around the carrier tube 3 such that opposite edges of the filter sheet overlap each other both in the unexpanded and the expanded position of the carrier tube 3.

Figure 6:
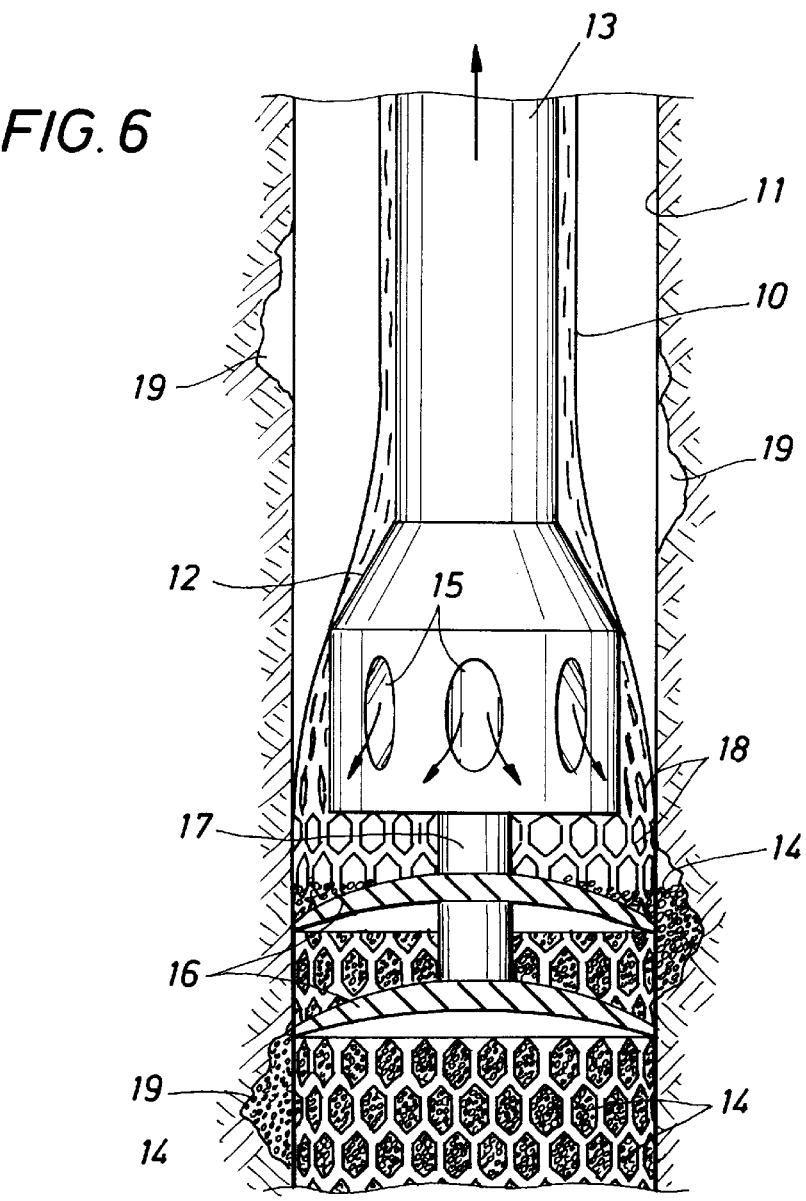
FIG. 6 is a schematic longitudinal sectional view of an expanding slotted tube where resin coated granules are wiped into the slots to form, after curing of the resin, a sandscreen.

FIG. 6 shows an embodiment of the screen according to the invention where a screen is formed in situ within the borehole. An expandable slotted steel tube 10 is expanded against the borehole wall 11 by pulling an expansion cone 12 upwardly through the tube 10.

The cone 12 is suspended at the lower end of a coiled tubing 13 via which resin coated granules 14 are injected which pass via injection ports 15 just below the cone 12 into the interior of the expanding tube 10. A set of two disk-shaped wipers 16 is trailed behind the cone by a rod 17 which press the granules 14 out of the interior of the expanded tube 10 into the expanded slots 18 and any gaps 19 that may be present between the borehole wall 11 and the expanded tube 10. After curing of the resin the granules are bonded to a permeable matrix of granules which fills the expanded slots 18 and which is also bonded to the rims of these slots 18. The diameter of the granules 14 is selected such that the pores between the granules 14 form sieve openings of a size suitable to prevent ingress of sandgrains into the well. For most sandgrain sizes a suitable granule size is between 0.5 and 5 mm.

Another deformable well screen was constructed from seven layers of wire mesh woven in a plain rectangular weave pattern with respectively the following sieve opening sizes: 5000/950/162/625/325/950/5000 $\mu$m.

These layers were sintered together in a vacuum to form a plate, which was then rolled into the form of a tube and seam welded.

The layers consisted of sheets of woven wire mesh of 350 mm long and 170 mm wide which were sintered together in a vacuum furnace between two plates of cordierite ceramic. These plates were pressed together by a 9 kg weight. The material was sintered for four hours at 1260° C. and a pressure of $10^{-4}$ Pa. The material was allowed to cool in the furnace under vacuum.

After the sintering procedure the stack of layers was about 9 mm thick. It was then rolled in a rolling mill to a thickness of 5 mm in one pass and sintered for a further four hours under the same conditions.

The sintered plate was subsequently cut to a length of 310 mm and placed in a 3-roll bending machine with the 170 mm edge parallel to the roll axis and rolled to make a tube of about 100 mm diameter and 170 mm long.

The seam was then brazed. However, if desired, it would have been possible to weld the seam. In the thus created tubular screen the layers with the sieve opening sizes of 162 and 325 $\mu$m acted principally as the filter layers whereas the other layers, viz those with sieve opening sizes of 625, 950 and 5000 $\mu$m acted essentially as protective layers. The filter layer with the finest sieve opening size, i.e. 162 $\mu$m, surrounded the filter layer with the coarser sieve opening size, i.e. 325 $\mu$m, to reduce sand accumulation within the screen.

The following tests were carried out with sintered woven wire sieve plates according to the invention.

A short length of a tubular sieve plate was axially compressed between platens in a press to reduce its length by 10%. The tube walls showed incipient buckles. No obvious changes in sieve opening size were found in a visual inspection. The length changes in the finest mesh accommodated by bulging outwards between the wires of the coarser mesh, with apparent retention of weave pattern and sieve opening dimensions.

Furthermore a disc of sintered mesh was placed in a 0.5 m long cell, 50 mm diameter, containing 1500 g sand from a hydrocarbon fluid production well in Uiterburen, the Netherlands. Air at 100 bar was flowed through the sand bed and the screen for a week at a nominal velocity through the screen of 5 m/s. The pressure drop over sand bed and screen remained constant at 3 bar.

The weight of the sand recovered from the cell after the test was 9 g less.

It was concluded from this test that the screen stabilized the sand sufficiently to prevent significant migration of the fine sand. Further the screen was not plugged to the extent that a significant increase in pressure drop resulted.

It was also concluded that the combination of protective layers having a coarse mesh and made from thick wire with filter layers with fine mesh that are sintered together creates a robust structure with a fine sieve size. Sintering the various layers together produces a screen having a section modulus which is greater than the sum of section moduli of the individual layers.

The weaving patterns and wire gauges in the various layers can be selected to give the desired combination of strength and compliance in radial, circumferential and longitudinal directions so that the screen can be made as a self supporting tube which can be reeled from a drum into the well and then expanded downhole.

If the predominant weaving pattern has its warp axis parallel to the tube axis and the warp threads are bent over and under the weft threads, while the latter are relatively undistorted (as for example in reversed plain Dutch weave or reversed Dutch twill) then the yield strain in longitudinal bending will be relatively high but at relatively low stress, and the tube can be easily bent; while if the weft threads are bent and the warp threads straight (plain Dutch weave or Dutch twill) the tube can be more easily expanded or reduced in diameter. If the warp and weft threads are at an angle of 45° to the tube axis (as in helically welded tube) then a square mesh weave will be deformed to a diamond pattern as a result of any deformation causing length or diameter changes, and the sieve aperture will only change slightly and by a predictable amount. If two layers of the fine mesh are separated by coarse mesh, sand eroding the first layer will accumulate in the space between the two layers and offer some protection against erosion to the second layer, not only by forming a barrier but also by locally reducing the permeability and hence the flow. If the outermost fine mesh has a smaller sieve opening size than the next fine layer, then any material which passes through the outer fine layer may also pass through subsequent fine layers, reducing the tendency of the screen to internal plugging. Preferably the sieve opening size of the outermost filter layer is at least two times smaller than any of the other filter and protective layers.

Yet another deformable well screen was made of a non-woven needlefelt consisting of aramid fibers which is marketed by the company Duflot under the trademark "KEVLAR" EA 205.

The needlefelt was 4 mm thick, had a weight of 400 g/m$^2$ and was manufactured by needle punching.

A needlefelt sheet was brought into a tubular shape and the engaging ends of the sheet were stitched together. The thus formed tubular screen was then arranged around an expandable slotted tube which initially had an internal diameter of 38 mm. The tube was subsequently expanded to an internal diameter of 80 mm. Before and after the expansion the wall thickness of the tube was 5 mm. The force required to pull a cone through the tube in order to expand the tube and screen assembly was 30 KN. This is 6 KN more than the force required for expansion of the expandable slotted tube alone.

The expansion of the screen did not cause any damage to the needlefelt or to the stitches. The thickness of the needlefelt was reduced by 37.5%.

The expanded tube and screen assembly had a length of 285 mm and was placed in a tubular container with a 30 mm thick annular layer of sand around the screen. The sand was 0–0.1 mm sand from a hydrocarbon well in Pekela, the Netherlands. The sand had a permeability K=2.10 Darcy and a porosity n(p)=42.39%.

Water was pumped radially via six injection points through the annular sand pack and screen into the interior of the expanded tube and then circulated back during a period of six hours.

During the test the fluid pressure inside the tube was about 2.6 bar and the fluid pressure at the injection point was about 2.7 bar.

The water flux through the screen was 5 l/min. Throughout the test no sand was detected in the circulated water and the pressure drop across the sand pack and screen remained constant at about 0.1 bar. From the test it was concluded that the expansion of the screen had caused no significant effect on the performance of the screen as a sand filter and that thus only minor variations in sieve opening size of the screen had occurred as a result of the expansion.

The test was repeated with a silt fraction of 15$\mu$ to 63$\mu$, smeared onto the screen, which yielded a similar favorable result.

Further the longevity of the needlefelt screen was tested by clamping it between steel plates with circular holes of various sizes. The steel plates were located such that the corresponding holes in the respective plates were co-axial. The plates with the needlefelt exposed at the location of the holes were then sandblasted for substantial periods.

No damage to the needlefelt screen was observed after the test for the holes smaller than 5 mm diameter.

It was concluded from the various tests that a needlefelt or other geotextile fabric is suitable for use as a deformable sandscreen. It was also concluded that such a screen can be made and installed in a cost effective manner by arranging a tubular fabric layer between two perforated co-axial pipes. Such an assembly of fabric layer and pipes can be reeled on a drum and transported to the well site, where the assembly is reeled from the drum into the well. The fabric layer may consist of an elongate strip which is wound helically around the inner perforated pipe such that adjacent windings of the strip at least partly overlap each other.

The above assembly is particularly attractive if a screen of substantial length is to be installed in a compacting reservoir.

Alternatively a tubular needlefelt or other fabric layer is arranged between a pair of co-axial expandable slotted tubes. In such case the fabric may also consist of a strip which is wound helically around the inner expandable tube such that a substantial overlap exists between adjacent windings of the strip before expansion of the tubes.

The overlap is in such case selected sufficiently large that after expansion of the assembly at least some overlap remains between adjacent windings of the fabric strip.

Reference is now made to yet another embodiment of the deformable tubular well screen according to the invention which is not illustrated. In this embodiment the screen comprises a tubular screen in which axial slots are present, which slots are regularly distributed in a staggered partly overlapping pattern over the surface of the screen. The tested screen was made of a nickel tube which had before expansion an internal diameter of about 145 mm and a wall thickness of 0.66 mm. The slots each had a length of about 3.5 mm and a width of 0.15 mm before expansion. The slots were pitched 5 per 24.5 mm longitudinally and 17 per 24.5 mm circumferentially, the longitudinal axis of the slots being parallel to the tube.

One millimeter thick steel protective expandable slotted tubes were co-axially arranged within and around the screen. The protective tubes each comprised slots having before expansion a length of about 20 mm and a width of about 2.2 mm. The slots in these protective tubes were pitched at 24 mm longitudinally and 4.2 mm circumferentially.

A 2 m long assembly of the nickel sand screen and steel protective screen was arranged within a steel casing having an internal diameter of about 160 mm and in which nine inspection holes having a diameter of about 30 mm were present.

The assembly was expanded against the inner wall of the casing by pulling a cone through the assembly. Visual examination of the assembly demonstrated a tight fit between the assembly and casing and a substantially uniform expansion of the protective tubes and the nickel sand screen. As a result of the expansion the slots of the nickel sand screen had opened up to a diamond shape and the smallest width of the slots was between 0.3 and 0.4 mm. It was concluded that small variations in the slot widths were due to slight variations in the exact amount of expansion and that these variations were within acceptable limits.

A flow test was carried out during which tap water was allowed to flow via three inspection holes through the screen at rates of between 8 and 10 liters per minute. During the test the pressure drop across the screen remained between 0.1 and 0.2 bar.

A ten meter long version of this screen was installed and tested in an oil well in Oman. The production data show that not only does the screen control sand production without the need for gravel packing but also that the well's productivity is unimpaired compared to its productivity before installation of the screen. The screen also showed no signs of plugging over a sustained period of production.

We claim:

1. A deformable well screen for preventing migration of solid particles into a hydrocarbon production well, which screen comprises:
    at least one substantially tubular filter layer having a sieve opening size which is tailored to the size of particles that are to be blocked by the screen,
    wherein the filter layer is deformable such that it can be expanded, bent, and/or compressed during installation of the screen in a wellbore and that any variation of the sieve opening size of each filter layer as a result of such deformation remains within predetermined limits
    wherein the filter layer comprises a series of scaled filter sheets which are arranged around an expandable slotted carrier tube and which, when seen in a circumferential direction, are connected at one edge to said tube and at another edge at least partly overlap an adjacent filter sheet.

2. The well screen of claim 1, wherein the well screen is coilable around a drum and installable into a well by reeling the screen from the drum.

3. The well screen of claim 1 wherein the filter sheets are connected to said carrier tube by a series of lugs that are hooked onto the carrier tube and wherein an expandable slotted protective tube surrounds the filter layer.

4. The well screen of claim 1 wherein the filter sheets are made of a flexible permeable material which is selected from the group consisting of a perforated metal plate, a metal plate comprising an array of substantially tangential slots, a sintered woven metal wire and a synthetic fabric.

5. The well screen of claim 1 wherein the deformable tubular filter layer which is made of a woven metal wire screen; and the screen further comprises;
    an outer protective layer which co-axially surrounds the filter layer or layers and an inner protective layer which is fitted co-axially within the protective layer or layers, which protective layers comprise each a woven metal wire screen having a larger sieve opening size and wire thickness than at least one of the filter layers, and wherein the filter and protective layers are sintered together.

6. The well screen of claim 5 wherein at least one filter layer comprises wires which are oriented in a substantially helical weaving pattern relative to a central axis of said layer.

7. The well screen of claim 6 wherein a helix defined by the helical weaving pattern is oriented at a pitch angle between 40° and 50° relative to said central axis.

8. The well screen of claim 6 wherein the screen comprises filter sheets that are brought into a helical shape and welded together is a substantially non-overlapping helical pattern.

9. The well screen of claim 5 comprising an inner and an outer filter layer which are co-axial to each other and separated by an intermediate layer which is made of a woven wire having a larger sieve opening than the filter layers and which is sintered to the filter layers, and wherein the outer filter layer has a smaller sieve opening than the inner filter layer.

10. The well screen of claim 9 wherein a pair of outer protective layers surrounds the outer filter layer and a pair of inner protective layers is fitted within the inner filter layer and wherein the outermost outer protective layer and the innermost inner protective layer have a larger sieve opening size than the other layers.

11. The well screen of claim 1 wherein the screen comprises at least one filter layer which is substantially made of a fabric.

12. The well screen of claim 11 wherein the filter layer comprises an elongate fabric strip which is wound in an overlapping helical pattern into a substantially tubular shape.

13. The well screen of claim 1 wherein the screen comprises an expandable tubular body with longitudinal micro-slots that are arranged in a staggered and overlapping pattern, which micro-slots substantially have before expansion of the tubular body a length less than 10 mm.

14. The screen of claim 13 wherein the tubular body is made of nickel and the micro-slots substantially have a length less than 5 mm and a width less than 0.3 mm.

15. A method of installing a deformable well screen in a hydrocarbon production well, the method comprising the steps of:
    arranging the screen around an expandable slotted tube;
    lowering the screen and tube assembly into the well; and
    expanding the tube and thereby increasing the internal diameter of the screen to be increased with at least five per cent while any variation of the sieve opening size of each filter layer of the screen is less than fifty per cent.

16. The method of claim 15 wherein the screen and tube assembly is wound around a drum and reeled from said drum into the well during installation.

* * * * *